(12) United States Patent
Ma

(10) Patent No.: US 11,204,478 B2
(45) Date of Patent: Dec. 21, 2021

(54) LENS MODULE

(71) Applicant: AAC Technologies Pte. Ltd., Singapore (SG)

(72) Inventor: Jie Ma, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 244 days.

(21) Appl. No.: 16/528,555

(22) Filed: Jul. 31, 2019

(65) Prior Publication Data

US 2020/0041752 A1 Feb. 6, 2020

(30) Foreign Application Priority Data

Aug. 6, 2018 (CN) .......................... 201821260533.3

(51) Int. Cl.
*G02B 7/02* (2021.01)
*H04N 5/225* (2006.01)
*G02B 13/00* (2006.01)
*G02B 7/00* (2021.01)

(52) U.S. Cl.
CPC ............. *G02B 7/022* (2013.01); *G02B 7/003* (2013.01); *G02B 13/002* (2013.01); *H04N 5/2254* (2013.01)

(58) Field of Classification Search
CPC ...... G02B 7/022; G02B 13/002; G02B 7/003; G02B 7/021; H04N 5/2254
See application file for complete search history.

(56) References Cited

U.S. PATENT DOCUMENTS

| 2015/0260940 A1* | 9/2015 | Yan ........................ G02B 7/021 359/793 |
| 2018/0039047 A1* | 2/2018 | Lin ........................ G02B 1/041 |
| 2018/0335607 A1* | 11/2018 | Lin .................... G02B 13/0035 |

* cited by examiner

*Primary Examiner* — Darryl J Collins
*Assistant Examiner* — Matthew Y Lee
(74) *Attorney, Agent, or Firm* — W&G Law Group

(57) ABSTRACT

The present disclosure relates to the technical field of optical imaging technologies, and provides a lens module. The lens module includes a lens barrel having a receiving space, and a lens received in the receiving space. The lens barrel includes a first barrel wall defining a light through hole, and a second barrel wall extending from an outer side of the first barrel wall while being bent towards an image side, the second barrel wall and the first barrel wall defining the receiving space. The lens includes a first area having a first processing precision, and the first area includes an optical portion for imaging and an engagement portion extending from a periphery of the optical portion. The engagement portion abuts against the first barrel wall.

4 Claims, 2 Drawing Sheets

LENS MODULE

TECHNICAL FIELD

The present disclosure relates to the technical field of optical imaging technologies, and in particular, to a lens module.

BACKGROUND

With development of technologies, electronic devices are becoming more and more intelligent. In addition to digital cameras, portable electronic devices such as tablets and mobile phones are also equipped with a lens module having a camera function to meet the user's requirements for taking pictures at any moment. In the related art, the lens module includes a lens barrel having a receiving space, and a lens received in the receiving space. Since it is difficult to guarantee precision of an outer diameter of the lens, it is necessary to make the lens be engaged with the lens barrel. Here, the lens is provided with an existing engagement structure to be engaged with the lens barrel.

The inventor of the present disclosure found a problem in the related art that since an engagement position of the lens is outside an effective diameter and a mold processing precision is not high, precision of the engagement of the lens with the lens barrel will not be high, and thus the lens module will have a low yield.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
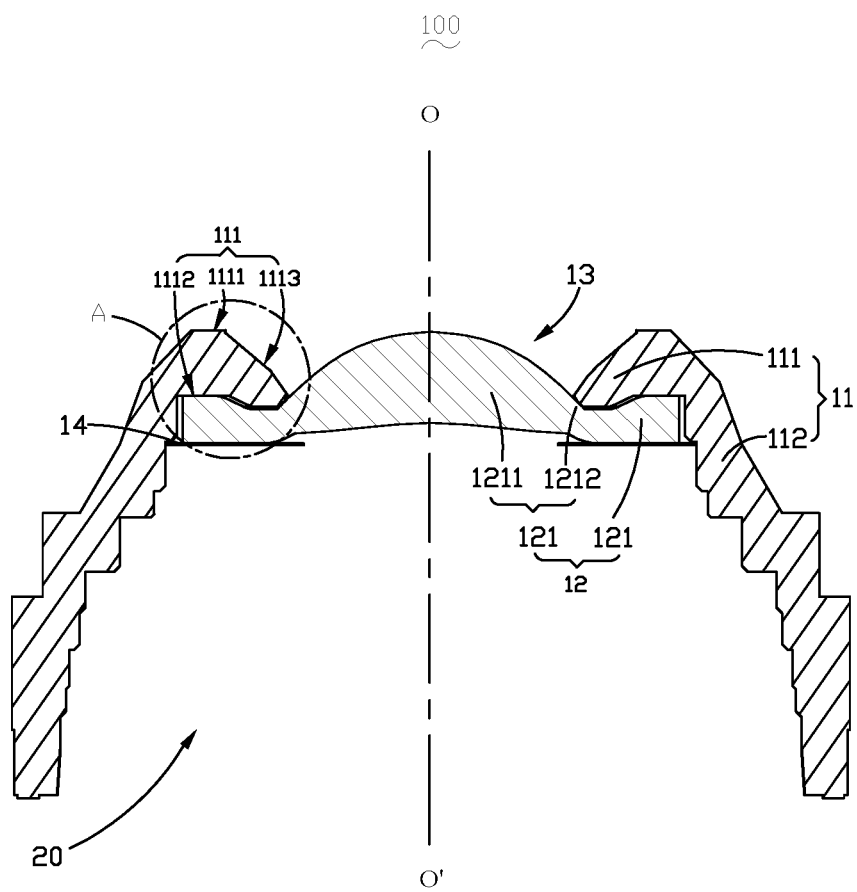
FIG. 1 is a cross-sectional structural schematic view of a lens module according to a first embodiment of the present disclosure.
Figure 2:
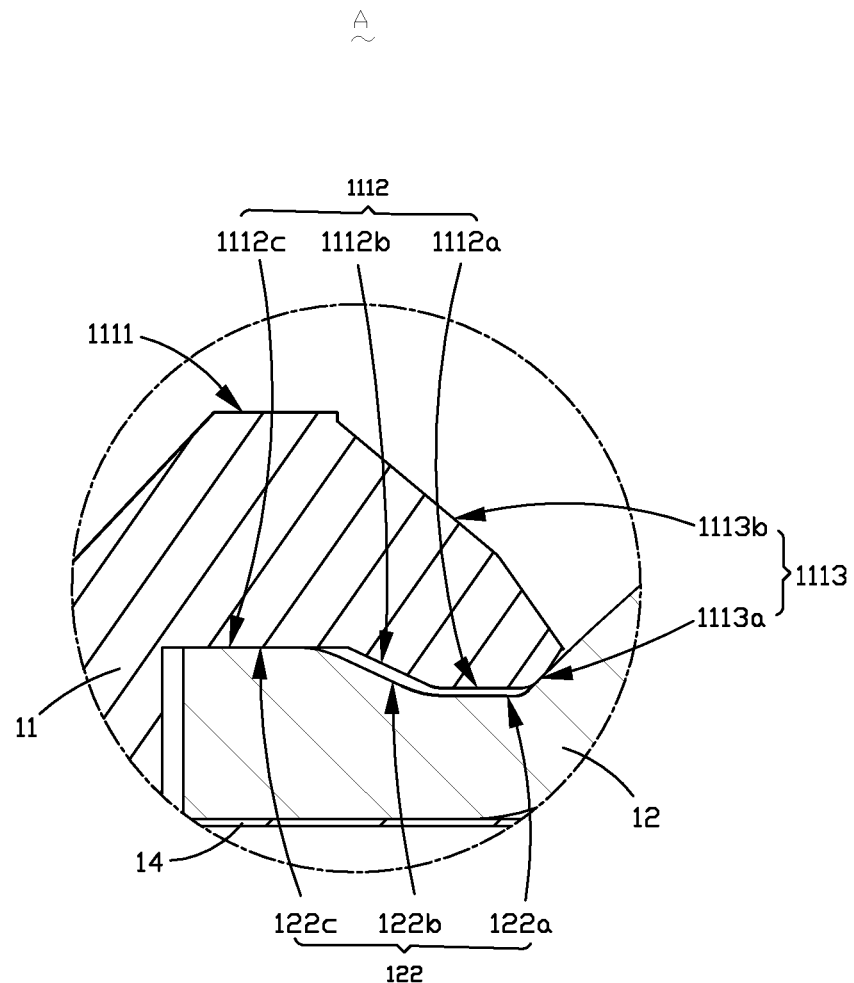
FIG. 2 is an enlarged view of a portion A of FIG. 1.

A first embodiment of the present disclosure provides a lens module 100. As shown in FIG. 1 and FIG. 2, the lens module 100 includes a lens barrel 11 and a lens 12. The lens barrel 11 includes a receiving space 20, and the lens 12 is received in the receiving space 20. The lens barrel 11 includes a first barrel wall 111 defining a light through hole 13, and a second barrel wall 112 extending from outside of the first barrel wall 111 towards an image side. The second barrel wall 112 and the first barrel wall 111 define a receiving space 20. The lens 12 includes a first area 121 having a first processing precision. The first area 121 includes an optical portion 1211 for imaging, and an engagement portion 1212 extending from a periphery of the optical portion 1211. The engagement portion 1212 abuts against the first barrel wall 111.

Compared with the related art, in this embodiment of the present disclosure, the engagement portion 1212 extends from the periphery of the optical portion 1211, herein the optical portion 1211 generally has an aspheric surface, i.e., the engagement portion 1212 is located at an end of the aspheric surface. During manufacturing process of the lens 12, the end of the aspheric surface and the optical portion 1211 are processed by a cutting tool in a single processing. Since the cutting tool and a program for mold processing of the optical portion 1211 have a higher precision, and the end of the aspheric surface and the optical portion 1211 are processed by a cutting tool in a single processing, the end of the aspheric surface can also achieve a non-spherical precision. That is, the engagement portion 1212 has a first processing precision. In this way, the precision of the engagement of the lens with the lens barrel is improved, thereby greatly improving the yield of the lens module 100.

In this embodiment, the lens 12 is made of a glass material. The lens 12 made of glass has a better light transmittance, up to 99%, thereby improving the imaging quality of the lens module 100. The lens 12 is not easy to yellow for a long time and thus has a long service life. The glass lens 12 has a high hardness, thereby resulting in a good abrasion resistance.

Specifically, the first barrel wall 111 includes an object-side surface 1111 close to an object side, an image-side surface 1112 disposed opposite to the object-side surface 1111, and a connecting surface 1113 connecting the object-side surface 1111 with the image-side surface 1112 and defining the light through hole 13. The connecting surface 1113 includes an engagement surface 1113a extending from an edge of the image-side surface 1112 close to an optical axis OO' along a direction facing towards the optical axis OO' and facing towards the object side, and an extending surface 1113b obliquely extending from an edge of the engagement surface 1113a close to the object side along a direction facing away from the optical axis OO' and facing towards the object side. The engagement portion 1212 abuts against the engagement surface 1113a. Since the engagement surface 1113a extends from the edge of the image-side surface 1112 close to the optical axis OO' along the direction facing towards the optical axis OO' and facing towards the object side, that is, it is an engagement, thereby improving manufacturing convenience. Meanwhile, since the extending surface 1113b extends along the direction facing away from the optical axis OO', a viewing angle of the lens module 100 is enlarged.

In this embodiment, the lens 12 further includes a second area 122 having a second processing precision and surrounding the engagement portion 1212. The second area 122 abuts against the image-side surface 1112. Here, the second processing precision is lower than first processing precision. By the second area 122 abutting against the image-side surface 1112, a position of the lens 12 in the direction of the optical axis OO' can be more stably delimited, thereby improving stability of the lens module 100.

Further, the image-side surface 1112 includes a first planar surface 1112a extending from an edge of the engagement surface 1113a close to the image side along a direction facing away from and perpendicular to the optical axis OO', a first oblique surface 1112b obliquely extending from an edge of the first planar surface 1112a facing away from the optical axis OO' along a direction facing away from the optical axis OO' and facing towards the object side, and a second planar surface 1112c extending from an edge of the first oblique surface 1112b facing away from the optical axis OO' along a direction facing away from and perpendicular to the optical axis OO'. The second area 122 abuts against the second planar surface 1112c. In this way, an edge thickness of the lens 12 can be guaranteed, thereby facilitating manufacturing process of the lens 12.

Preferably, the first planar surface 1112a and the first oblique surface 1112b are spaced apart from the second area 122. Specifically, the second area 122 sequentially includes a third planar surface 122a horizontally extending outwards from an outer side of the engagement portion 1212, a second oblique surface 122b obliquely extending from the third planar surface 122a along a direction facing towards the object side, and a fourth planar surface 122c horizontally extending from the second oblique surface 122b. The first planar surface 1112a is spaced apart from the third planar surface 122a, and the first oblique surface 1112b is spaced apart from the second oblique surface 122b. In this way, it can prevent protrusion of the first planar surface 1112a and the first oblique surface 1112b due to low processing precision, which would otherwise obstruct engagement of the lens 12 with the lens barrel 11, thereby improving the yield.

Specifically, a light-blocking sheet 14 is arranged at a side of the lens 12 close to the image side. The light-blocking sheet 14 can prevent stray light and light leakage, thereby improving an optical performance of the lens module 100.

The lens module provided by the present disclosure may further include other lenses (not shown), a light-blocking sheet (not shown), a press ring (not shown), and the like.

It should be understood by those skilled in the art that the above embodiments are merely some specific embodiments of the present disclosure, and various changes in form and details may be made without departing from the scope of the present disclosure.

What is claimed is:

1. A lens module, comprising:
   a lens barrel having a receiving space; and
   a lens received in the receiving space,
   wherein the lens barrel comprises a first barrel wall defining a light through hole, and a second barrel wall extending from an outer side of the first barrel wall while being bent towards an image side, the second barrel wall and the first barrel wall defining the receiving space,
   the lens comprises a first area having a first processing precision, and the first area comprises an optical portion for imaging and an engagement portion extending from a periphery of the optical portion, the engagement portion abutting against the first barrel wall;
   the first barrel wall comprises an object-side surface close to an object side, an image-side surface disposed opposite to the object-side surface, and a connecting surface that connects the object-side surface with the image-side surface and defines the light through hole; the connecting surface comprises an engagement surface obliquely extending from an edge of the image-side surface close to an optical axis along a direction facing towards the optical axis and towards the object side; and the engagement portion abuts against the engagement surface;
   the lens further comprises a second area having a second processing precision and surrounding the engagement portion, and the second area abuts against the image-side surface;
   the image-side surface comprises a first planar surface extending from an edge of the engagement surface close to the image side along a direction facing away from and perpendicular to the optical axis, a first oblique surface obliquely extending from an edge of the first planar surface facing away from the optical axis along a direction facing away from the optical axis and facing towards the object side, and a second planar surface extending from an edge of the first oblique surface facing away from the optical axis along the direction facing away from and perpendicular to the optical axis, the second area abutting against the second planar surface;
   the second planar surface is closer to the object side than the engagement surface along a direction of the optical axis.

2. The lens module as described in claim 1, wherein the first planar surface and the first oblique surface are spaced apart from the second area.

3. The lens module as described in claim 2, wherein the second area comprises a third planar surface horizontally extending outwards from an outer side of the engagement portion, a second oblique surface obliquely extending from the third planar surface along a direction facing towards the object side, and a fourth planar surface horizontally extending from the second oblique surface, the first planar surface being spaced apart from the third planar surface, and the first oblique surface being spaced apart from the second oblique surface.

4. The lens module as described in claim 1, wherein the lens is made of a glass material.

* * * * *